(12) United States Patent
Saito

(10) Patent No.: US 10,538,136 B2
(45) Date of Patent: Jan. 21, 2020

(54) DAMPING FORCE CONTROL DEVICE FOR VEHICLE

(71) Applicant: TOYOTA JIDOSHA KABUSHIKI KAISHA, Toyota-shi, Aichi (JP)

(72) Inventor: Takashi Saito, Fuji (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 239 days.

(21) Appl. No.: 15/593,944

(22) Filed: May 12, 2017

(65) Prior Publication Data

US 2017/0326936 A1 Nov. 16, 2017

(30) Foreign Application Priority Data

May 13, 2016 (JP) .................................. 2016-096906

(51) Int. Cl.
*B60G 17/016* (2006.01)

(52) U.S. Cl.
CPC .... *B60G 17/0164* (2013.01); *B60G 2600/187* (2013.01); *B60G 2800/70* (2013.01); *B60G 2800/85* (2013.01)

(58) Field of Classification Search
CPC ............ B60G 17/0161; B60G 17/0164; B60G 17/018; B60G 17/08; B60G 2400/10; B60G 2400/91; B60G 2500/10; B60G 2600/124; B60G 2600/187; B60G 2600/1875; B60G 2600/1877; B60G 2600/60; B60G 2800/70; B60G 2800/85; B60G 2800/916

See application file for complete search history.

(56) References Cited

U.S. PATENT DOCUMENTS 5,322,320 A 6/1994 Sahashi et al.
5,444,621 A * 8/1995 Matsunaga ........ B60G 17/0165
280/5.518

FOREIGN PATENT DOCUMENTS

JP 6-143965 A 5/1994
JP 8-216646 A 8/1996

* cited by examiner

*Primary Examiner* — Jerrah Edwards
(74) *Attorney, Agent, or Firm* — Sughrue Mion, PLLC

(57) ABSTRACT

A damping force control device for controlling damping forces of shock absorbers by a control device, which is configured to extract first vibration components in a first frequency range and second vibration components in a higher frequency range than the first frequency range from vertical accelerations of a sprung mass at the positions of wheels, to calculate correction coefficients which decrease as the degree of the second vibration increases with respect to the degree of the first vibration, and to control damping coefficients of the shock absorbers so as to be the products of target damping forces calculated based on the vertical accelerations of the sprung mass and the correction coefficients.

4 Claims, 12 Drawing Sheets

DAMPING FORCE CONTROL DEVICE FOR VEHICLE

CROSS-REFERENCE TO RELATED APPLICATION

The disclosure of Japanese Patent Application NO. JP2016-96906 filed on May 13, 2016 is incorporated by reference in its entirety.

BACKGROUND

1. Technical Field

The present disclosure relates to a damping force control device for a vehicle such as an automobile.

2. Description of the Related Art

In a vehicle such as an automobile, a shock absorber is disposed between a sprung mass and an unsprung mass corresponding to each wheel. Each shock absorber damps vertical vibration of a sprung mass by generating a damping force corresponding to a product of a relative speed of the sprung and unsprung masses and a damping coefficient. Since a required damping force varies depending on a running condition of a vehicle, damping force variable type shock absorbers capable of changing damping coefficients are mounted depending on the vehicle, and the damping coefficients are controlled according to the running condition of the vehicle.

Vertical vibrations of the sprung mass generated when a vehicle is traveling include multiple vibrations of various frequencies. Particularly, when a vehicle travels on a running road having a waviness, vertical vibrations of the sprung mass are vibrations having relatively low frequencies and large amplitudes, that is, vibrations with many so-called floating components. On the other hand, when a vehicle travels on a running road with an irregular road surface, vertical vibrations of the sprung mass are vibrations having relatively high frequencies and small amplitudes, that is, vibrations with many so-called rugged components.

When the vertical vibrations of the sprung mass are vibrations with a relatively larger amount of floating components, it is preferable that a damping force be increased in order to effectively attenuate the vertical vibrations of the sprung mass to improve a ride comfort of the vehicle. On the other hand, when the vertical vibrations of the sprung mass are vibrations with a relatively larger amount of rugged components, if the damping forces are increased, the vibrations of unsprung masses received from a road surface are easily transmitted to the sprung mass so that the ride comfort of the vehicle is deteriorated. Consequently, the damping forces are preferably lowered. Therefore, it is preferable that the damping forces are controlled in accordance with a ratio of floating components and rugged components contained in the vertical vibrations of the sprung mass.

For example, Japanese Patent Application Laid-open No. H08-216646 discloses a method of extracting floating components and rugged components from a vertical acceleration of a sprung member, calculating an increase/decrease amount of a damping force based on a maximum value of absolute values of each component extracted during a predetermined period of time, and increasing and decreasing the damping force of each shock absorber based on the calculated increase/decrease amount. In calculating the increase/decrease amount of the damping force, a map showing the relationship between the maximum value of the absolute values of the floating component and the rugged component and the increase/decrease amount of the damping force is referred to.

In the damping force control device described in the aforementioned Japanese Patent Application Laid-open No. H08-216646, a map must be produced for each type of vehicle having different specifications, by extracting floating components and rugged components from the vertical acceleration of the sprung mass and calculating a necessary increase/decrease amount of the damping force based on maximum values of the absolute values of the components that are extracted during a predetermined period of time. A map is a two-dimensional map showing the relationship between the maximum values of the absolute values of floating components and rugged components and the necessary increase/decrease amount of the damping force and it is necessary to determine the necessary values experimentally, for example. Consequently, it takes a lot of time and labor to produce a map.

SUMMARY

The present disclosure provides a damping force control device which is improved to preferably control damping forces in accordance with the ratios of the floating components and the rugged components included in vertical vibrations of a sprung mass without requiring a map that requires a great deal of time and labor for preparation.

According to the present disclosure, a damping force control device for a vehicle is provided which has damping force variable type shock absorbers mounted between a sprung mass and unsprung masses corresponding to wheels, detecting devices that detect vertical vibration state quantities of the sprung mass at positions of the wheels, and a control unit configured to control damping forces of the shock absorbers based on the vertical vibration state quantities of the sprung mass.

The control unit is configured to calculate target damping forces of the shock absorbers based on the vertical vibration state quantities of the sprung mass; to extract first vibration components in a first frequency range including a vertical resonance frequency of the sprung mass and second vibration components in a frequency range between the vertical resonance frequency of the sprung mass and a resonance frequency of the unsprung masses from the vertical vibration state quantities of the sprung mass; to calculate correction coefficients so that the higher the degree of the second vibration with respect to the degree of the first vibration, the smaller the correction coefficients are; and to control the damping coefficients of the shock absorbers so that the damping forces of the shock absorbers become final target damping forces which are the products of the target damping forces and the correction coefficients.

According to the above configuration, target damping forces of the shock absorbers are calculated based on the amount of vertical vibration quantities of the sprung mass and the components of the first and second vibrations are extracted from the vertical vibration state quantities of the sprung mass. The first vibration component is a vibration component of the first frequency range including vertical resonance frequency of the sprung mass, that is, a floating component, and the second vibration component is a vibration component of the sprung mass in the frequency range between the resonance frequency of the sprung mass and the resonance frequency of the unsprung masses, ie, the rugged component.

The correction coefficients are calculated so that the higher the degree of the second vibration with respect to the degree of the first vibration is, the smaller the correction coefficients are. In other words, the correction coefficients are calculated so as to decrease as the degree of the rugged vibration components with respect to the degree of the floating vibration components increases. Further, the damping coefficients of the shock absorbers are controlled so that the damping forces of the shock absorbers become the final target damping forces which are the products of the target damping forces and the correction coefficients, that is, the target damping forces corrected by the correction coefficients.

Therefore, the correction coefficients are controlled such that the damping forces of the shock absorbers become smaller as the degree of the rugged vibration components is higher with respect to the degree of the floating vibration components. Therefore, when the degree of the rugged vibration components is lower than the degree of the floating vibration components, the damping forces of the shock absorbers do not become small, so that it is possible to effectively attenuate the vibrations of the floating components. On the other hand, when the degree of the rugged vibration components is higher than the degree of the floating vibration components, the damping forces of the shock absorbers become smaller, so that the vibrations of the unsprung masses received from a road surface are less likely to be transmitted to the sprung mass, which enables to reduce the possibility that the ride comfort of the vehicle is deteriorated.

Further, according to the above configuration, a two-dimensional map showing the relationship between the maximum values of the absolute values of the floating vibration components and the rugged vibration components and the necessary increase/decrease amounts of the damping force is unnecessary. Therefore, it is not necessary to create a map by taking a lot of time and effort to determine necessary values experimentally, for example.

ASPECTS OF THE PRESENT DISCLOSURE

In one embodiment of the present disclosure, the control unit is configured to calculate the correction coefficients so that the correction coefficients increase as a vehicle speed increases.

Generally, when a vehicle speed is low, the ride comfort of a vehicle is important, while on the other hand, when the vehicle speed is high, the driving stability of the vehicle is important. In the damping force control device described in the aforementioned Japanese Patent Application Laid-open No. H08-216646, since a vehicle speed is not taken into consideration, the increase and decrease amounts of the damping forces can not be changed according to a vehicle speed so that a good ride comfort of the vehicle is secured when the vehicle speed is low, and good driving stability of the vehicle is secured when the vehicle speed is high.

According to the above aspect, since the correction coefficients are calculated to increase as the vehicle speed increases, the damping forces increase as a vehicle speed increases. Therefore, when a vehicle speed is low, it is possible to prevent the damping forces from becoming excessive to ensure good ride comfort of the vehicle, and when a vehicle speed is high, sufficient damping forces can be generated to achieve good driving stability of the vehicle.

In another aspect of the present disclosure, the control unit is configured to limit rates of change of the correction coefficients, and to control the damping forces of the shock absorbers so that the damping forces become the final target damping forces which are the products of the target damping forces and the correction coefficients whose rates of change are limited.

According to the above aspect, since the change rates of the correction coefficients are limited, it is possible to reduce the possibility that the damping forces of the shock absorbers suddenly change due to the sudden changes of the correction coefficients accompanying the changes of the degree of the first vibration and/or the degree of the second vibration.

In another aspect of the present disclosure, the control unit is configured to calculate first and second index values indicating the degrees of the first and second vibrations based on the first and second vibration components, respectively, and to calculate the correction coefficients based on the ratio of the first and second index values.

According to the above aspect, the first and second index values indicating the degrees of the first and second vibrations are calculated based on the first and second vibration components, respectively, and the correction coefficients are calculated based on the ratio of the first and second index values. Since the magnitude of the ratio of the first and second index values indicates the magnitude relationship between the degrees of the first and second vibrations, the correction coefficients can be calculated based on the ratio of the first and second index values so as to be smaller as the degree of the second vibration is higher with respect to the degree of the first vibration.

Furthermore, in another aspect of the present disclosure, the control unit is configured to calculate the first and second index values indicating the degrees of the first and second vibrations based on the first and second vibration components, respectively, and to calculate the correction coefficients based on the difference between the first and second index values.

According to the above aspect, the first and second index values indicating the degrees of the first and second vibrations are calculated based on the first and second vibration components, respectively, and the correction coefficients are calculated based on the differences between the first and second index values. Since the sign and the magnitude of the difference between the first and second index values indicate the magnitude relationship between the degrees of the first and second vibrations, the correction coefficients can be calculated based on the difference between the first and second index values so that the correction coefficients become smaller as the degree of the second vibration is higher with respect to the degree of the first vibration.

DETAILED DESCRIPTION

The present disclosure will now be described in detail with reference to the accompanying drawings.

[First Embodiment]

Figure 1:
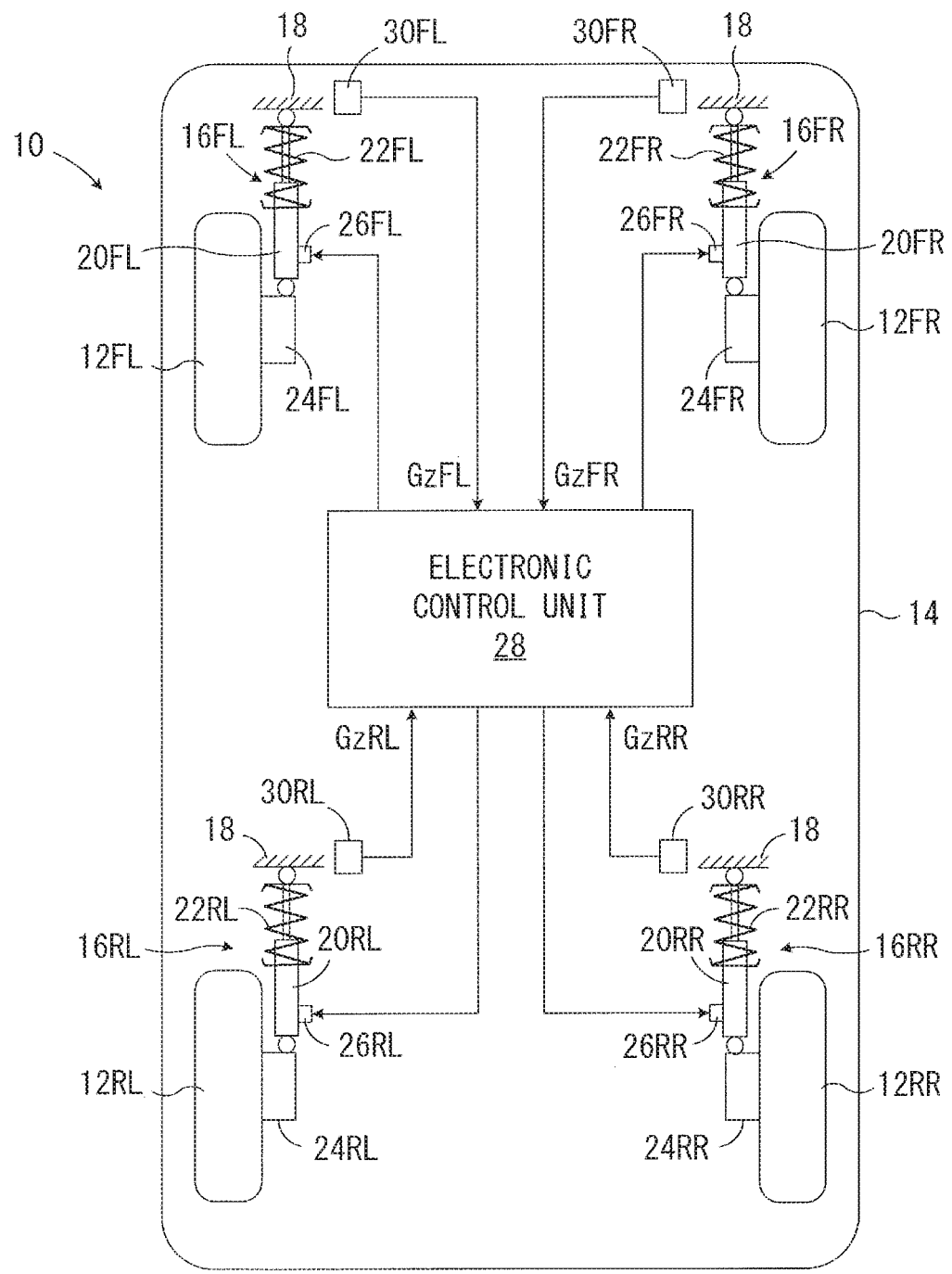
FIG. 1 is a schematic configuration diagram showing a first embodiment of a damping force control device according to the present disclosure.

As shown in FIG. 1, a damping force control device 10 according to the first embodiment is adapted to a vehicle 14 having right and left front wheels 12FL and 12FR which are steered wheels and left and right rear wheels 12RL and 12RR which are non-steered wheels. The left and right front wheels 12FL and 12FR are suspended from a vehicle body 18 by suspensions 16FL and 16FR, respectively, and the left and right rear wheels 12RL and 12RR are suspended from the vehicle body 18 by suspensions 16RL and 16RR, respectively.

The suspensions 16FL to 16RR include shock absorbers 20FL to 20RR and suspension springs 22FL to 22RR, respectively. The wheels 12FL to 12RR are rotatably supported by wheel carriers 24FL to 24RR, respectively, and the wheel carriers 24FL to 24RR are each connected to the vehicle body 18 by a suspension arm, not shown, so as to be mainly displaceable in the vertical direction with respect to the vehicle body 18. The shock absorbers 20FL to 20RR are mounted between the vehicle body 18 and the wheel carriers 24FL to 24RR or the suspension arms, respectively, and extend substantially in the vertical direction.

The vehicle body 18 can be displaced with respect to the wheels 12FL to 12RR at least in the vertical direction as the shock absorbers 20FL to 20RR and the suspension springs 22FL to 22RR expand and contract at the positions of the wheels 12FL to 12RR. Therefore, the vehicle body 18, parts of the shock absorbers 20FL to 20RR, parts of the suspension arms, and the like constitute the sprung mass of the vehicle 14. The wheels 12FL to 12RR, the wheel carriers 24FL to 24RR, the other parts of the shock absorbers 20FL to 20RR, the other parts of the suspension arms, and the like constitute the unsprung masses of the vehicle.

The suspension springs 22FL to 22RR suppress the vertical displacements of the wheels 12FL to 12RR caused by the vertical fluctuation of a road surface and impacts received by the wheels 12FL to 12RR from the road surface and the like from being transmitted to the sprung mass. The shock absorbers 20FL to 20RR generate damping forces for damping vibrations caused by relative displacements of the sprung and unsprung masses in the vertical direction. The shock absorbers 20FL to 20RR are damping force variable shock absorbers having actuators 26 FL to 26 RR, respectively, that change the opening amounts of built-in damping force generating valves.

The shock absorbers 20FL to 20RR have a plurality of control stages S. The control stages S are control stages having n (positive integer) steps from the control stage S1 (soft) having the smallest damping coefficients Ci (i=FL, FR, RL and RR) to the control stage Sn (hard) having the largest damping coefficients Ci. The shock absorbers 20FL to 20RR generate damping forces Fi (i=FL, FR, RL and RR) represented by the products Ci·Vri of the damping coefficients Ci (i=FL, FR, RL and RR) and relative speeds Vri in the vertical direction of the vehicle body 18 and the wheels 12FL to 12RR, respectively.

The actuators 26FL to 26RR are controlled by an electronic control unit 28. The vehicle body 18 is provided at positions corresponding to the wheels 12FL to 12RR with vertical acceleration sensors 30FL to 30RR that detect corresponding vertical accelerations GzFL to GzRR, respectively. Signals indicating the detected vertical accelerations GzFL to GzRR are input to the electronic control unit 28. Only three vertical acceleration sensors may be provided and a vertical acceleration of the vehicle body 18 at the position where no vertical acceleration sensor is provided may be estimated in a known manner based on the three vertical accelerations detected by the three vertical acceleration sensors.

Figure 2:
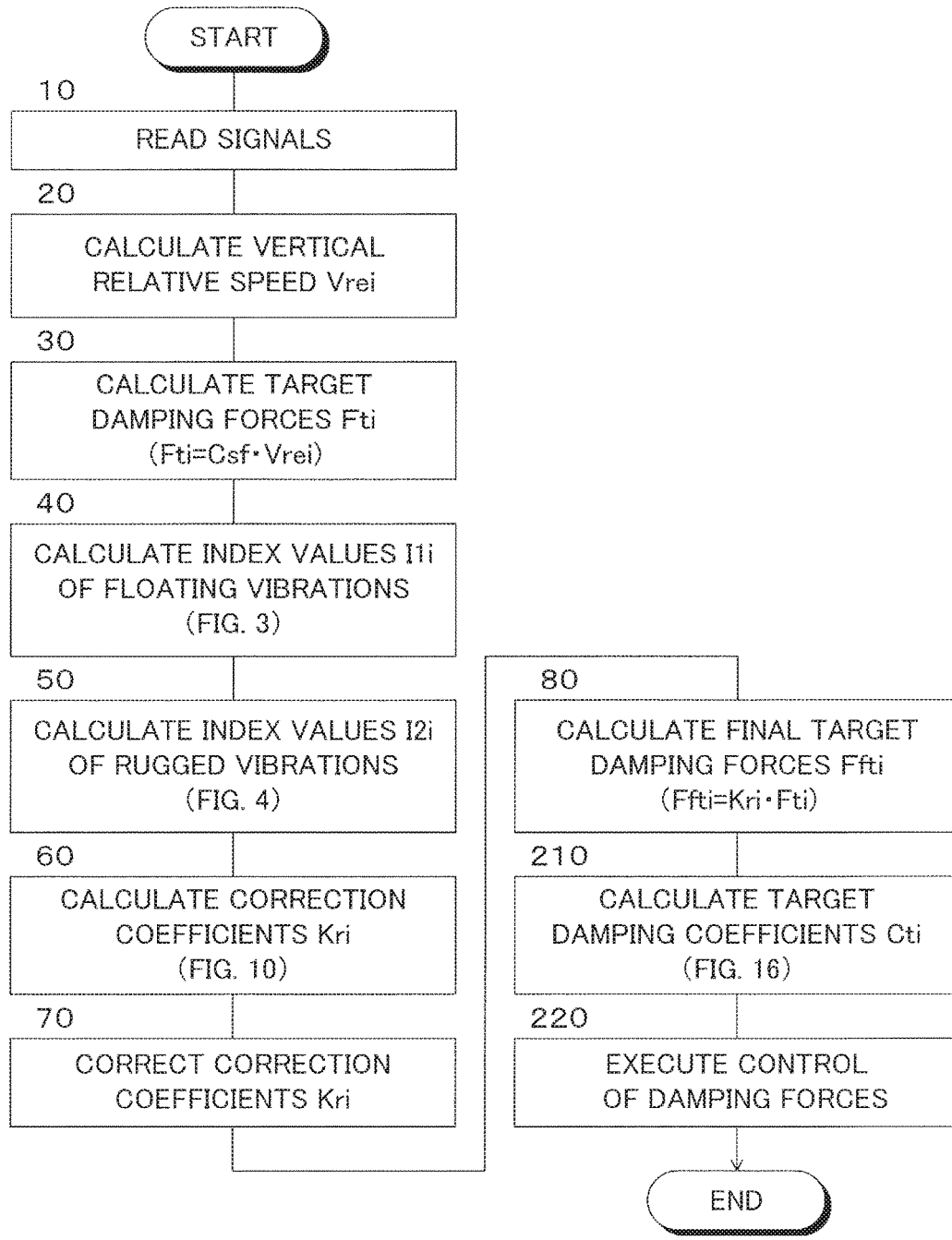
FIG. 2 is a flowchart showing a damping force control routine according to the first embodiment.
Figure 3:
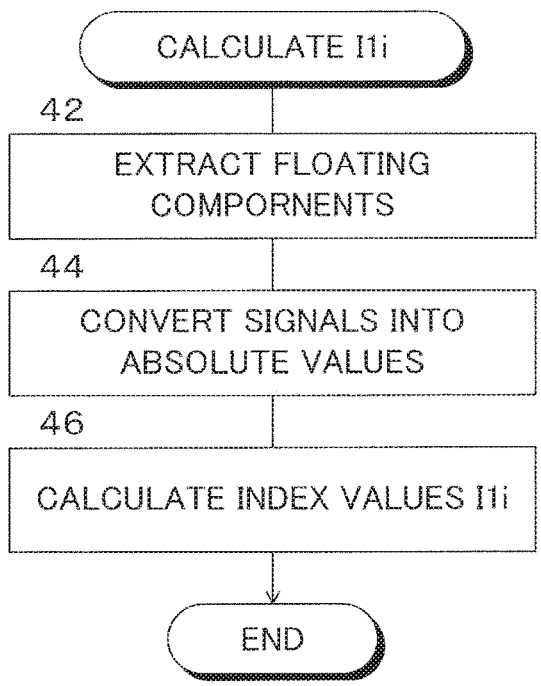
FIG. 3 is a flowchart showing a subroutine for calculating index values $I1i$ indicating the degrees of floating vibrations in the vertical accelerations in the first embodiment.
Figure 4:
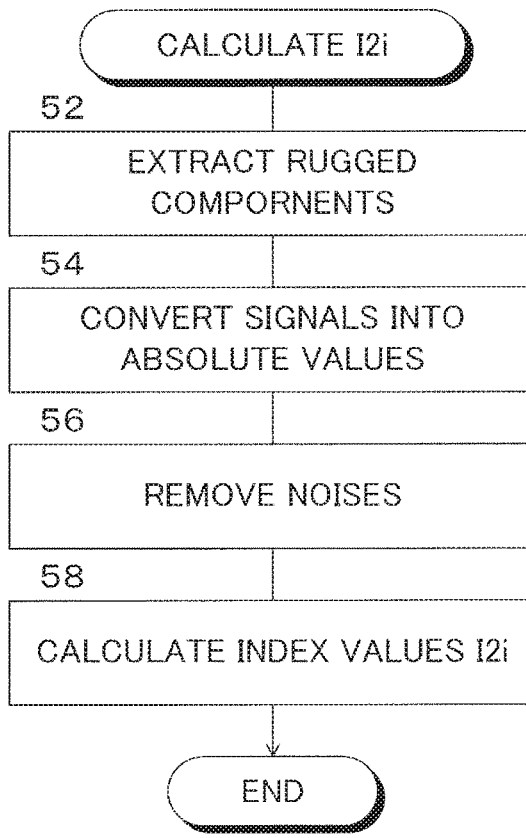
FIG. 4 is a flowchart showing a subroutine for calculating index values $I2i$ indicating the degrees of rugged vibrations in the vertical accelerations in the first embodiment.

Based on the vertical acceleration GzFL to GzRR, the electronic control unit 28 controls the damping forces Fi of the shock absorbers 20FL to 20RR according to a control program corresponding to the flowcharts shown in FIGS. 2 to 4. The electronic control unit 28 may be a microcomputer having, for example, a CPU, a ROM, a RAM, and an input/output port device, which are mutually connected by a bidirectional common bus. The control program is stored in the ROM, and the damping forces Fi are controlled by the CPU according to the control program.

Next, the damping force control routine in the first embodiment will be described with reference to the flowchart shown in FIG. 2. It is to be noted that the control according to the flowchart shown in FIG. 2 is repeatedly executed at predetermined time intervals sequentially for the left front wheel, the right front wheel, the left rear wheel, and the right rear wheel every prescribed period of time when an ignition switch (not shown) is ON. In the following description, the control of the damping forces executed according to the flowchart is simply referred to as "control".

First, in step 10, signals indicative of the vertical accelerations GzFL to GzRR detected by the vertical acceleration sensors 30 FL to 30 RR are read.

In step 20, vertical relative speeds Vrei (i=FL, FR, RL and RR) between the wheels 12FL to 12RR and the vehicle body 18 are calculated based on the vertical accelerations GzFL to GzRR in the manner described in the aforementioned Japanese Patent Application Laid-open No. H08-216646. Alternatively, vertical strokes Ssi (i=FL, FR, RL and RR) of the suspensions 16FL to 16RR may be detected and the vertical relative speeds Vrei may be calculated as the differential values of the vertical strokes Ssi. Further, a vertical acceleration Zbdi (i=FL, FR, RL and RR) of the vehicle body 18 and vertical accelerations Zwdi (i=FL, FR, RL and RR) of the unsprung masses may be detected and the vertical relative speeds Vrei may be calculated by calculating integral values of Zbdi−Zwdi.

In step 30, target damping forces Fti (i=FL, FR, RL and RR) of the shock absorbers 20FL to 20RR are calculated based on the vertical relative speeds Vrei according to the following formula (1). Note that Csf in the following formula (1) is a damping coefficient of the Skyhook control, but may be any damping coefficient of an arbitrary damping force control (for example, H∞ control) that damps a vibration of the vehicle body 18 to improve the ride comfort of the vehicle 14.

$$Fti = Csf \cdot Vrei \quad (1)$$

In step 40, index values I1$i$ (i=FL, FR, RL and RR) indicating the degree of the floating vibration as the first vibration (hereinafter simply referred to as "index values of floating vibration") are calculated based on the vertical accelerations GzFL to GzRR. It is to be noted that the floating vibration is a vibration in a frequency range in which an occupant of the vehicle 14 feels a loose feeling of the vehicle body 18. Specifically, the vibration is a vibration of 1 to 2 Hz which is a resonance frequency range of the vehicle body 18 as a sprung mass.

In step 50, index values I2$i$ (i=FL, FR, RL and RR) indicating the degree of the rugged vibration as the second vibration (hereinafter referred to simply as "index values of rugged vibration") are calculated based on the vertical accelerations GzFL to GzRR. It is to be noted that the rugged vibration is a vibration in a frequency range in which an occupant of the vehicle 14 feels an undesirable rugged feeling. Specifically, the vibration is a vibration in the frequency range of 6 to 10 Hz which is between a resonance frequency range of the vehicle body 18 as a sprung mass and a resonance frequency range of wheels 12FL to 12RR, the wheel carriers 24FL to 24RR and the like as unsprung masses. It should be noted that the lower limit frequency may be lower than 6 Hz as long as it is higher than a resonance frequency range of the unsprung masses.

Figure 10:
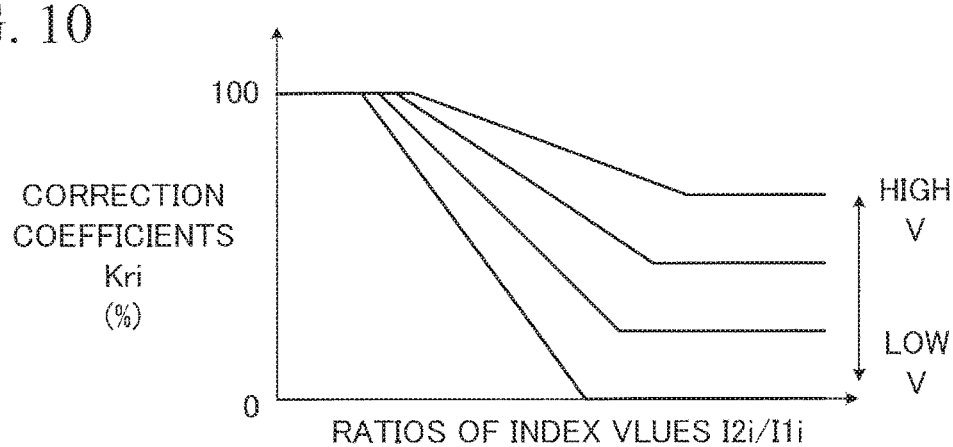
FIG. 10 is a map showing relationships between ratios $I2i/I1i$ of index values $I2i$ indicating the degree of rugged vibration to index values $I1i$ indicating the degree of floating vibration and correction coefficients Kri.

In step 60, ratios I2$i$/I1$i$ of the index values I2$i$ of the rugged vibration to the index values I1$i$ of the floating vibration are calculated, and furthermore, by referring to the map shown in FIG. 10, correction coefficients Kri (i=FL, FR, RL and RR) are calculated based on the ratios I2$i$/I1$i$. When the index values I1$i$ of the floating vibration are 0, the ratios I2$i$/I1$i$ are calculated after the index values I1$i$ are set to a positive constant close to 0 which is set in advance.

In step 70, the correction coefficients Kri are corrected by a low-pass filter so that the rates of change of the correction coefficients Kri are limited. The rates of change of the correction coefficients Kri may be limited by the means in which the magnitude of the change amount of the correction coefficients per unit time is guard processed; the correction coefficients are subjected to moving average processing; the correction coefficients are held at a constant value for a predetermined holding time, or the like. This also applies to correction coefficients in other embodiments described later.

In step 80, final target damping forces Ffti (i=FL, FR, RL and RR) of the shock absorbers 20FL to 20RR are calculated using the corrected correction coefficients Kri according to the following formula (2).

$$Ffti = Kri \cdot Fti \quad (2)$$

Figure 16:
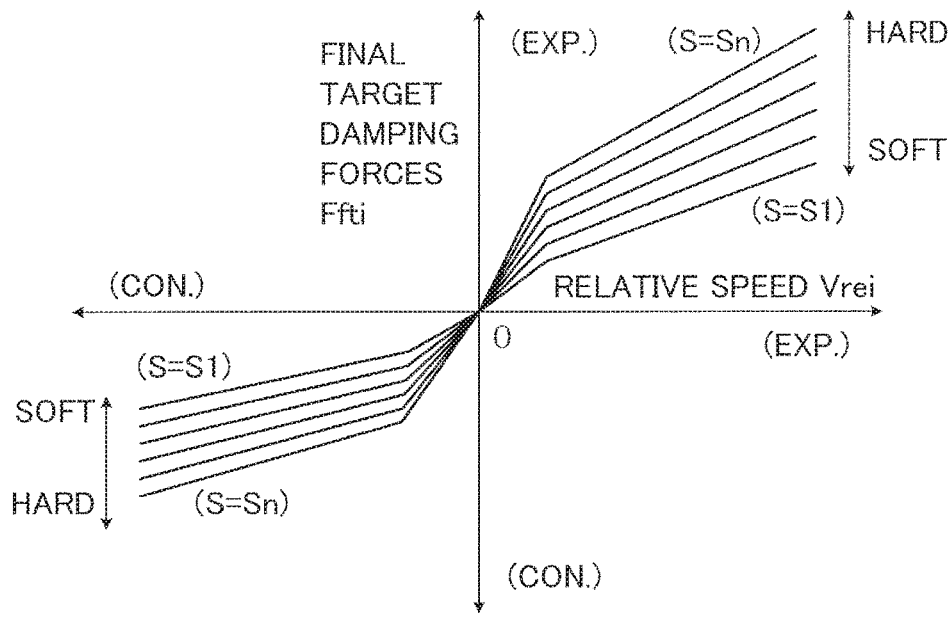
FIG. 16 is a map showing the relationship between relative speeds Vri in the vertical direction of a vehicle body and wheels, the target damping forces Fti and the control steps S of a shock absorber.

In step 210, by referring to the map shown in FIG. 16 based on the vertical relative speeds Vrei calculated in step 20 and the final target damping forces Ffti calculated in step 80, the target control stages S of the shock absorbers 20FL to 20RR are determined. That is, the target damping coefficients Cti (i=FL, FR, RL and RR) of the shock absorbers 20FL to 20RR are calculated.

In step 220, control of the damping forces is executed by controlling the control stages of the shock absorbers 20FL to 20RR so that the control stages become the target control stages S calculated in step 210. Therefore, by controlling the damping coefficients Ci of the shock absorbers 20FL to 20RR to the target damping coefficients Cti, the damping forces Fi are controlled to be the final target damping forces Ffti.

Next, with reference to the flowchart shown in FIG. 3, a subroutine for calculating the index values I1$i$ of the floating vibration to be executed in the above step 40 will be described.

In step 42, the signals indicating the vertical accelerations GzFL to GzRR are processed by a high-pass filter having a cutoff frequency of 0.5 Hz and further processed by a low-pass filter having a cutoff frequency of 2 Hz. Therefore, the floating components Gz1$i$ (i=FL, FR, RL and RR) in the frequency range of 0.5 to 2 Hz are extracted as the components of the first vibration from the vertical accelerations GzFL to GzRR. The frequency range of 0.5 to 2 Hz is an example, and the frequency range of the components of the first vibration may be different from the exemplified frequency range.

In step 44, the signals indicating the floating components are subjected to full-wave rectification so that the floating components are converted into absolute values. That is, negative values of the floating component signals are converted into positive values with the same absolute values.

In step 46, the maximum values of the floating components that are converted into the absolute values within the preset time Tc (positive constant) up to the present are calculated as the index values I1$i$ of the floating vibrations.

Next, with reference to the flowchart shown in FIG. 4, a subroutine for calculating the index values I2$i$ of the rugged vibration to be executed in step 50 will be described.

In step 52, the signals indicating the vertical accelerations GzFL to GzRR are processed by a high-pass filter having a cutoff frequency of 4 Hz and further processed by a low-pass filter having a cutoff frequency of 10 Hz. Therefore, rugged components Gz2$i$ ($i$=FL, FR, RL and RR) in the frequency range of 4 to 10 Hz are extracted as components of the second vibration from the vertical accelerations GzFL to GzRR. The frequency range of 4 to 10 Hz is an example, and the frequency range of the components of the second vibration may be different from the exemplified frequency range.

In step 54, the signals of the rugged components are full-wave rectified so that the rugged components are converted into absolute values. That is, negative values of the rugged component signals are converted into positive values with the same absolute values.

In step 56, the signals of the rugged components converted to the absolute values are processed by a low-pass filter having a cutoff frequency (for example 2 Hz) for removing high frequency noises, whereby the noises having frequencies higher than the frequencies of the rugged components are removed.

In step 58, the maximum values of the rugged components which were converted into the absolute values within the preset time Tc up to the present and whose noises are removed are calculated as the index values I2$i$ of the rugged vibrations.

For the calculations of the maximum values of the floating components and the rugged components, if necessary, refer to the aforementioned Japanese Patent Application Laid-Open No. H8-216646.

As understood from the above explanation, in step 20, vertical relative speeds Vrei between the wheels 12FL to 12RR and the vehicle body 18 are calculated based on the vertical accelerations GzFL to GzRR, and in step 30, target damping forces Fti of the shock absorbers 20FL to 20RR are calculated based on the vertical relative speeds Vrei. In steps 40 and 50, index values I1$i$ of the floating vibration and index values I2$i$ of the rugged vibration are calculated based on the vertical accelerations GzFL to GzRR.

In step 60, correction coefficients Kri are calculated based on the ratio I2$i$/I1$i$ of the index values I2$i$ of the rugged vibration to the index values I1$i$ of the floating vibration. The correction coefficients Kri decrease as the ratios I2$i$/I1$i$ increase and increase as a vehicle speed V increases. In step 70, the correction coefficients Kri are corrected so that the rates of change are limited.

In step 80, final target damping forces Fti are calculated as the products of the corrected correction coefficients Kri and the vertical relative speeds Vrei, and in steps 210 and 220, damping forces Fi of the shock absorbers 20FL to 20RR are controlled to the final target damping forces Fti.

[Second Embodiment]

Figure 5:
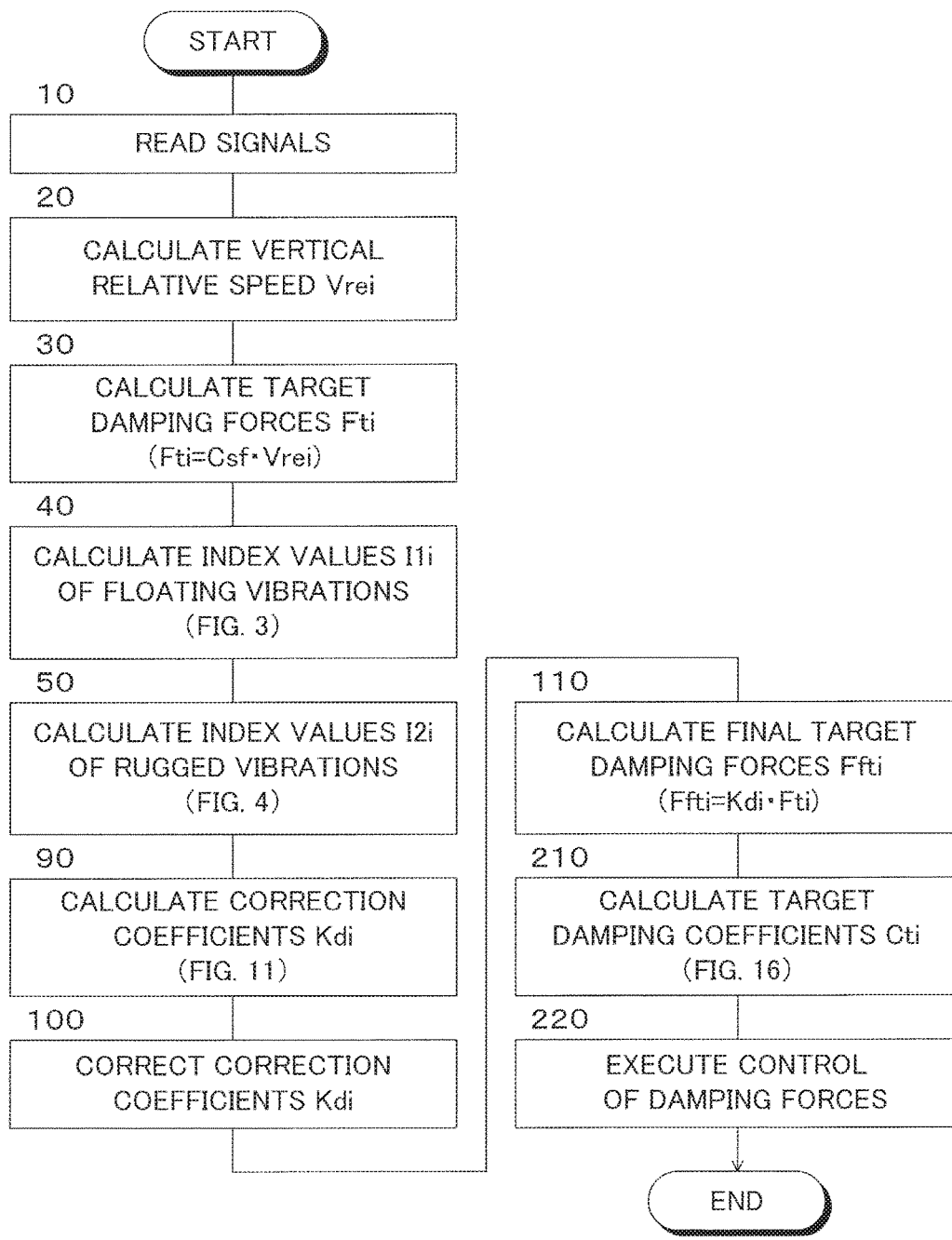
FIG. 5 is a flowchart showing a damping force control routine in the second embodiment of the damping force control device according to the present disclosure.

The second embodiment is configured as a modification example of the first embodiment, and the damping force control in the second embodiment is performed according to the flowchart shown in FIG. 5. In FIG. 5, the same step numbers as those shown in FIG. 2 are assigned to the same steps as those shown in FIG. 2. This also applies to other embodiments to be described later.

The second embodiment is configured as a modification example of the first embodiment, and steps 10 to 50 and steps 210 and 220 are executed in the same manners as in the first embodiment. In place of steps 60 to 80 in the first embodiment, steps 90 to 110 are executed, respectively.

Figure 11:
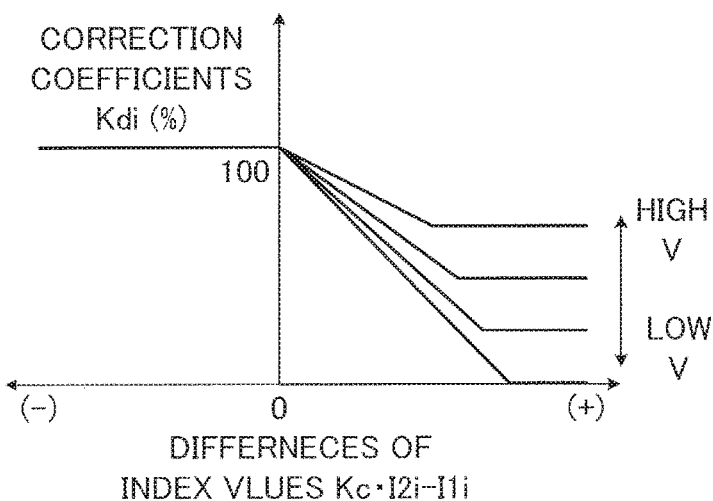
FIG. 11 is a map showing relationships between the correction coefficients Kdi and the differences $Kc·I2i–I1i$ between the product of the index values $I2i$ indicating the degree of rugged vibration and the correction coefficient Kc and the index values $I1i$ indicating the degree of floating vibration.

In step 90, differences Kc·I2$i$–I1$i$ between the products of the index values I2$i$ of rugged vibration and the correction coefficient Kc (positive constant) and the index values I1$i$ of floating vibration are calculated. Since amplitudes of rugged vibration are smaller than those of floating vibration and, accordingly, the magnitudes of the index values I2$i$ are smaller than those of the index values I1$i$, the correction coefficient Kc is a preset value for adjusting the magnitudes of the index values I2$i$ to those of the index values I1$i$. Further, correction coefficients Kdi ($i$=FL, FR, RL and RR) are calculated by referring to the map shown in FIG. 11 based on the differences Kc·I2$i$–I1$i$.

In step 100, the correction coefficients Kdi are corrected by low-pass filtering so that the rates of change are limited.

In step 110, final target damping forces Ffti of the shock absorbers 20FL to 20RR are calculated using the corrected correction coefficients Kdi according to the following formula (3).

$$Ffti = Kdi \cdot Fti \quad (3)$$

[Third Embodiment]

Figure 6:
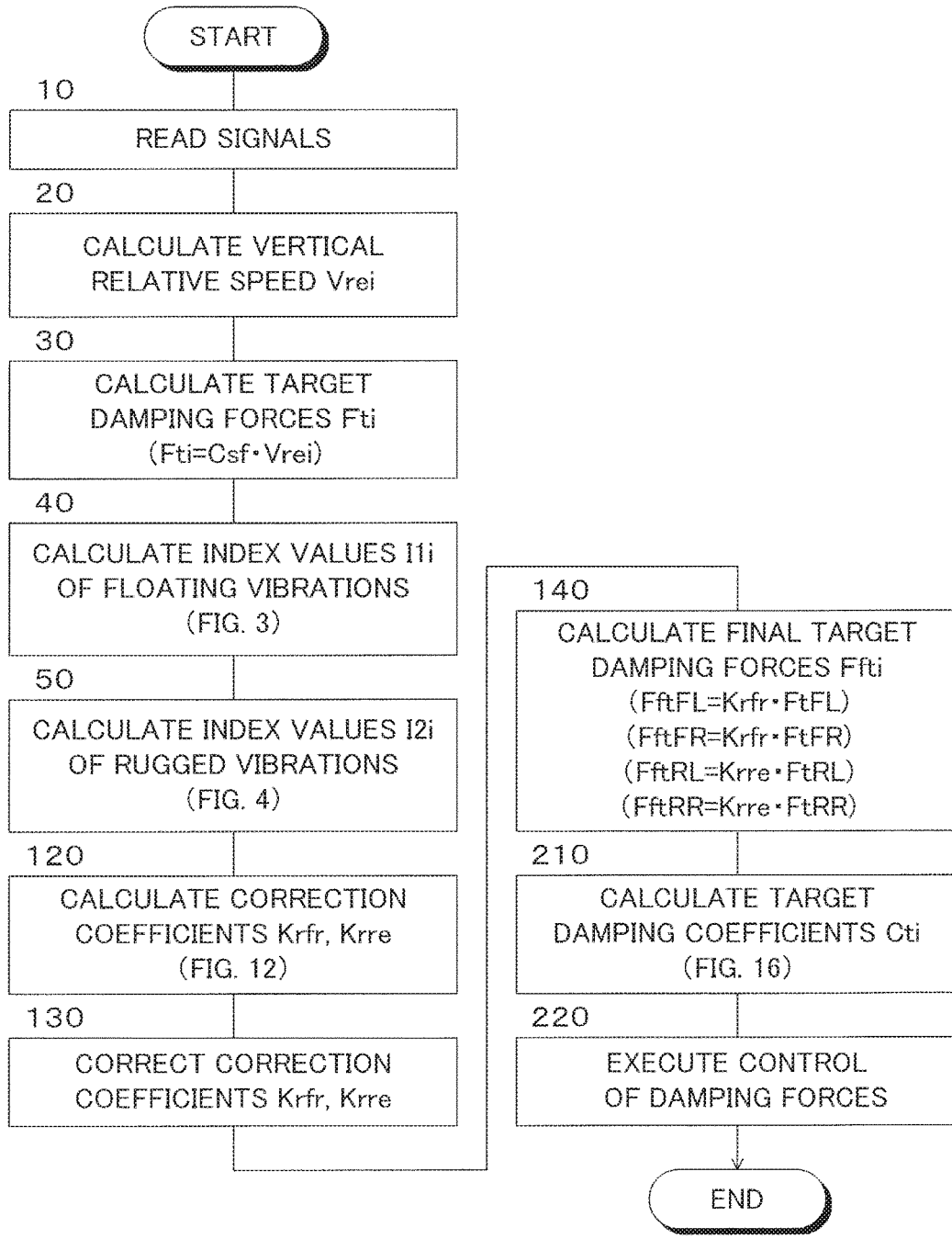
FIG. 6 is a flowchart showing a damping force control routine in the third embodiment of the damping force control device according to the present disclosure.

The third embodiment is also configured as a modification example of the first embodiment, and the damping force control in the third embodiment is performed alternately for the front two wheels and the rear two wheels, for example, according to the flowchart shown in FIG. 6. Steps 10 to 50 and steps 210 and 220 are executed in the same manners as in the first embodiment. In place of steps 60 to 80 in the first embodiment, steps 120 to 140 are executed, respectively.

In step 120, the larger one of the index values I1FL and I1FR of the floating vibration is set as the index value I1$fr$ of the floating vibration of the vehicle body 18 at the positions corresponding to the front wheels 12FL and 12FR. The larger one of the index values I1RL and I1RR of the floating vibration is set as the index value I1$re$ of the floating vibration of the vehicle body 18 at the positions corresponding to the rear wheels 12RL and 12RR. Likewise, the larger one of the index values I2FL and I2FR of the rugged vibration is set as the index value I2$fr$ of the rugged vibration of the vehicle body 18 at the positions corresponding to the front wheels 12FL and 12FR. Further, the larger one of the index values I2RL and I2RR of the rugged vibration is set as the index value I2$re$ of the rugged vibration of the vehicle body 18 at the positions corresponding to the rear wheels 12RL and 12RR.

Figure 12:
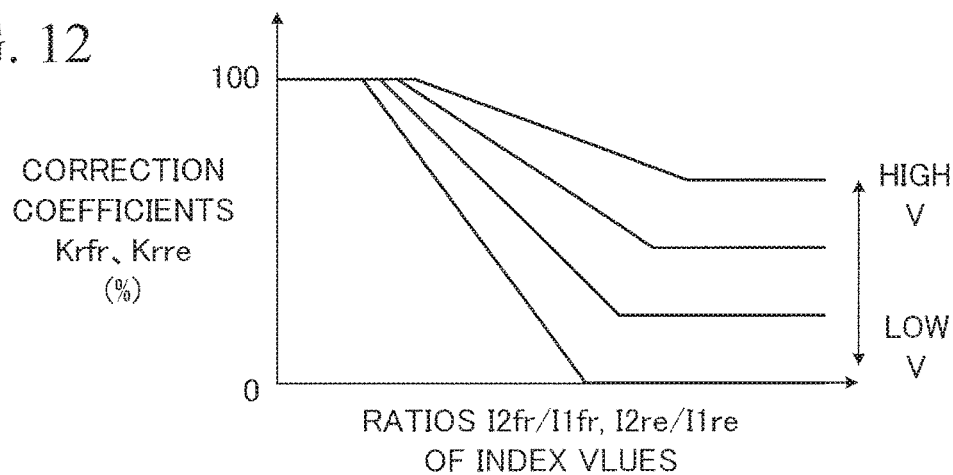
FIG. 12 is a map showing the relationships between the ratios $I2fr/I1fr$ and $I2re/I1re$ of the index values $I2fr$ and $I2re$ indicating the degree of the rugged vibration with respect to the index values $I1fr$ and $I1re$ indicating the degree of the floating vibrations and the correction coefficients Krfr and Krre.

In step 120, the ratios I2$fr$/I1$fr$ and I2$re$/I1$re$ of the index values I2$fr$ and I2$re$ of the rugged vibration to the index values I1$fr$ and I1$re$ of the floating vibrations are calculated, respectively. Furthermore, correction coefficients Krfr and Krre for the front two wheels and the rear two wheels are calculated by referring to the map shown in FIG. 12 based on the ratios I2$fr$/I1$fr$ and I2$re$/I1$re$, respectively.

In step 130, the correction coefficients Krfr and Krre are corrected by low-pass filtering so that the rates of change are limited.

In step 140, final target damping forces Ffti of the shock absorbers 20FL to 20RR are calculated according to the following formulas (4) to (7) using the corrected correction coefficients Krfr and Krre.

$$FftFL = Krfr \cdot FtFL \quad (4)$$

$$FftFR = Krfr \cdot FtFR \quad (5)$$

$$FftRL = Krre \cdot FtRL \quad (6)$$

$$FftRR = Krre \cdot FtRR \quad (7)$$

[Fourth Embodiment]

Figure 7:
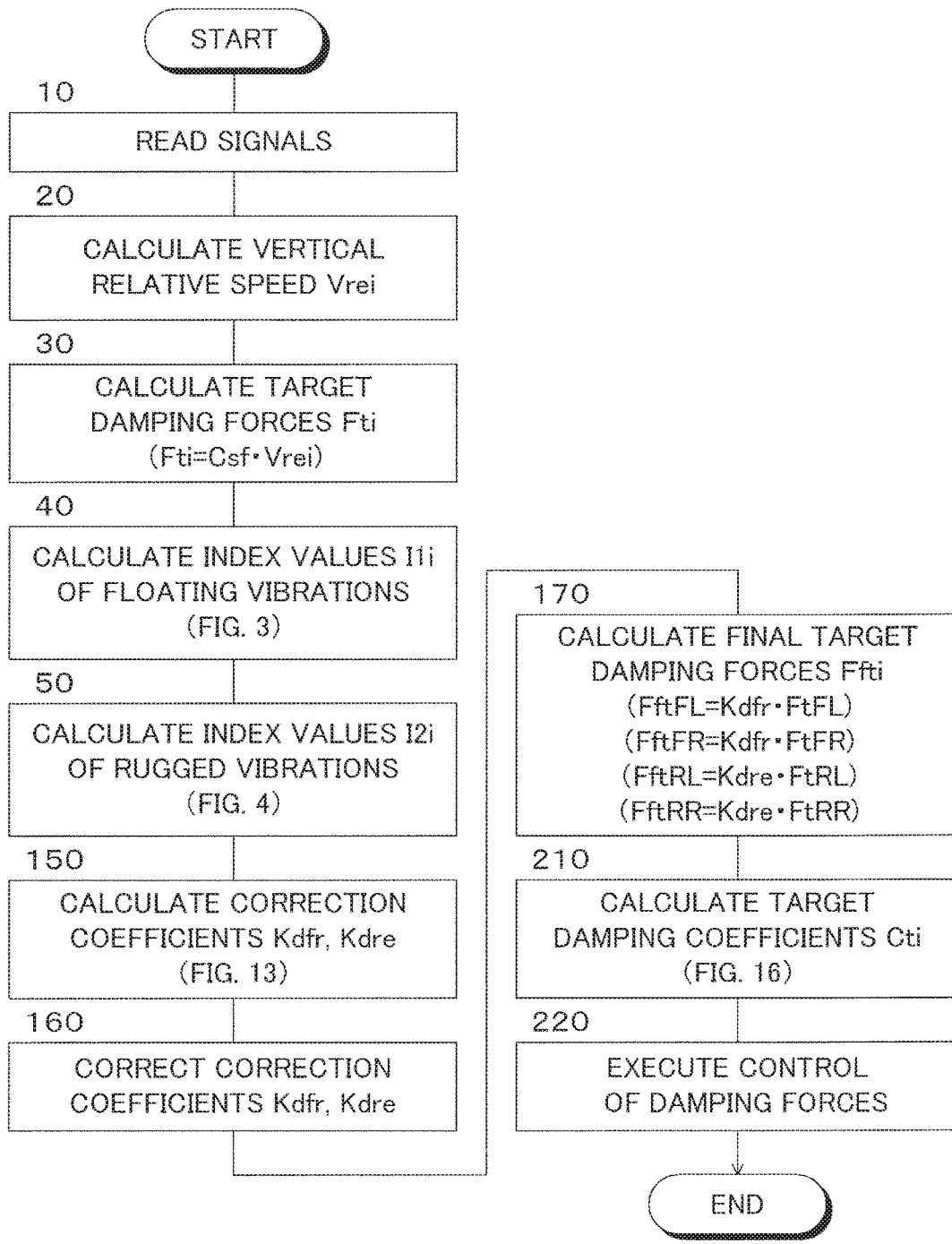
FIG. 7 is a flowchart showing a damping force control routine in the fourth embodiment of the damping force control device according to the present disclosure.

The fourth embodiment is configured as a modification example of the third embodiment, and the damping force control in the fourth embodiment is performed alternately for the front two wheels and the rear two wheels, for example, according to the flowchart shown in FIG. 7. Steps 10 to 50 and steps 210 and 220 are executed in the same manners as in the third embodiment. Steps 150 to 170 are executed in place of steps 120 to 140, respectively, in the third embodiment.

In step 150, as in step 120 in the third embodiment, index value I1$fr$ of the floating vibration and index value I2$fr$ of the rugged vibration of the vehicle body 18 at the positions corresponding to the front wheels 12FL and 12FR are calculated. Similarly, index value I1$re$ of the floating vibration and index value I2$re$ of the rugged vibration of the vehicle body 18 at the positions corresponding to the rear wheels 12RL and 12RR are calculated.

Figure 13:
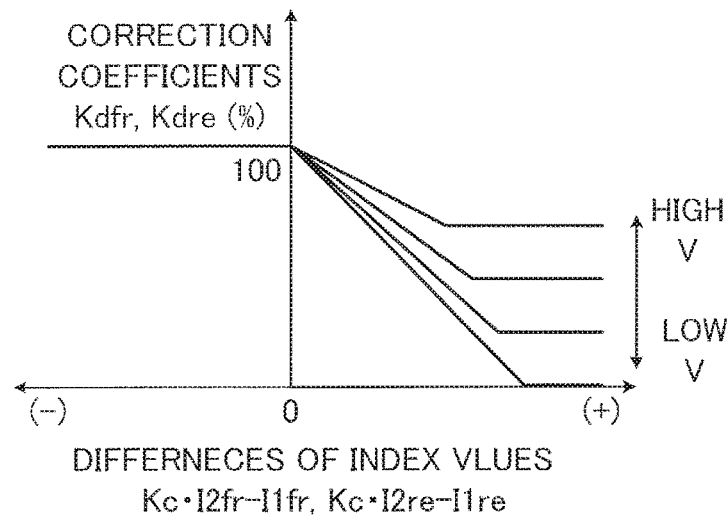
FIG. 13 is a map showing the relationships between the differences $Kc·I2fr–I1fr$ and $Kc·I2re–I1re$ between the product of a coefficient Kc and the index values $I2fr$ and $I2re$ indicating the degree of rugged vibrations, and the index values $I1fr$ and $I1re$ showing the degree of floating vibration, and the coefficients Kdfr and Kdre.

In step 150, similarly to step 90 in the second embodiment, difference Kc·I2$fr$−I1$fr$ between the product of the index value I2$fr$ of the rugged vibration and the correction coefficient Kc and the index value I1$fr$ of the floating vibration are calculated and difference Kc·I2$re$−I1$re$ between the product of the index value I2$re$ of the rugged vibration and the correction coefficient Kc and the index value I1$re$ of the floating vibration are calculated. Furthermore, correction coefficients Kdfr and Kdre for the front two wheels and the rear two wheels are calculated by referring to the map shown in FIG. 13 based on the differences Kc·I2$fr$−I1$fr$ and Kc·I2$re$−I1$re$, respectively.

In step 160, the correction coefficients Kdfr and Kdre are corrected by low-pass filtering so that the rates of change are limited.

In step 170, final target damping forces Ffti of the shock absorbers 20FL to 20RR are calculated according to the following formulas (8) to (11) using the corrected correction coefficients Kdfr and Kdre.

$$FftFL = Kdfr \cdot FtFL \quad (8)$$

$$FftFR = Kdfr \cdot FtFR \quad (9)$$

$$FftRL = Kdre \cdot FtRL \quad (10)$$

$$FftRR = Kdre \cdot FtRR \quad (11)$$

[Fifth Embodiment]

Figure 8:
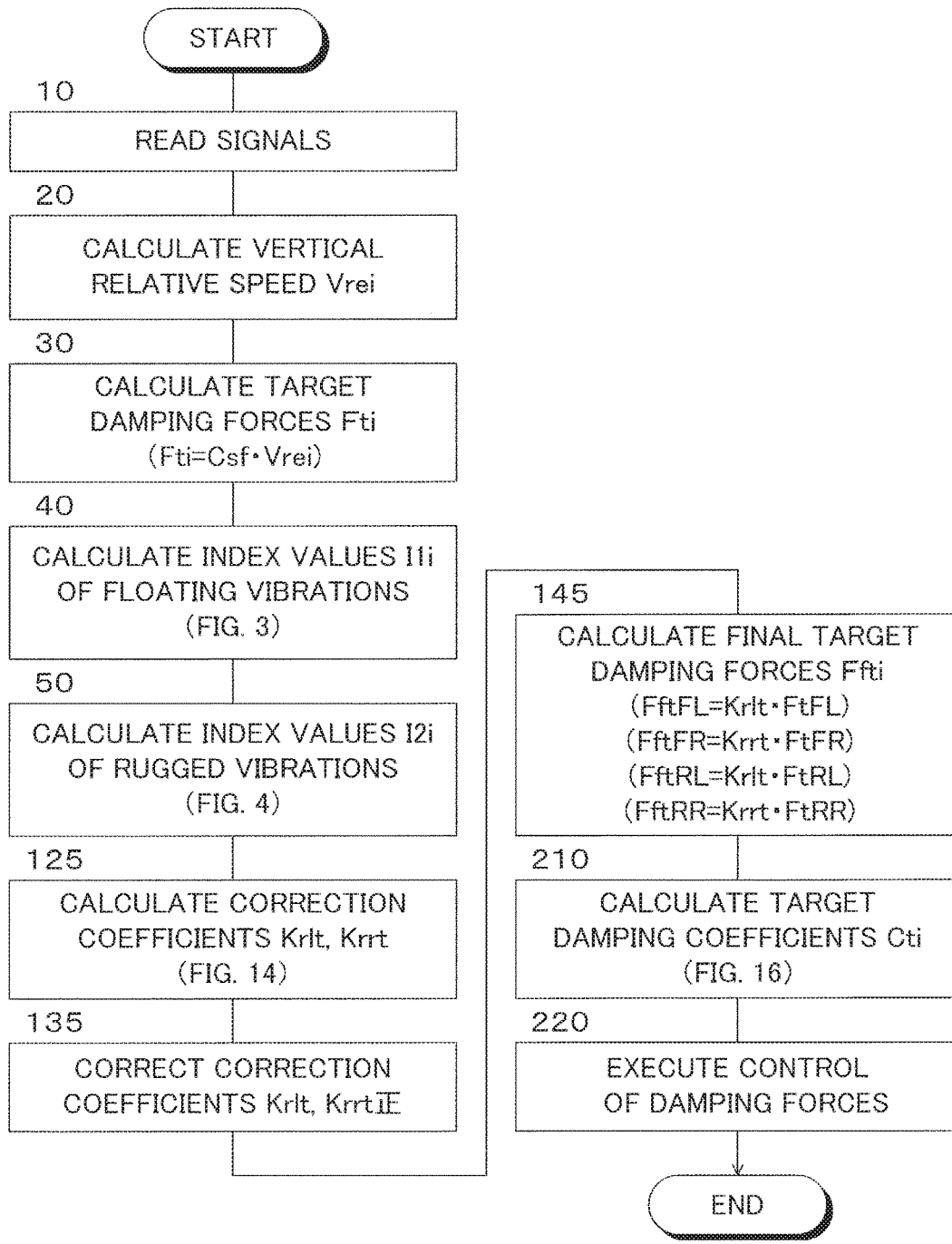
FIG. 8 is a flowchart showing a damping force control routine in the fifth embodiment of the damping force control device according to the present disclosure.

The fifth embodiment is configured as a modification example of the first embodiment, and the damping force control in the fifth embodiment is the same as the first embodiment except that the damping force control is performed alternately for the two left wheels and the two right wheels according to the flowchart shown in FIG. 8. Steps 10 to 50 and steps 210 and 220 are executed in the same manners as in the first embodiment. In place of steps 60 to 80 in the first embodiment, steps 125 to 145 are executed, respectively.

In step 125, the larger one of the index values I1FL and I1RL of the floating vibration is set as the index value I1$lt$ of the floating vibration of the vehicle body 18 at the positions corresponding to the two left wheels 12FL and 12RL. The larger one of the index values I1FR and I1RR of the floating vibration is set as the index value I1$rt$ of the floating vibration of the vehicle body 18 at the positions corresponding to the two right wheels 12FR and 12RR. Similarly, the larger one of the index values I2FL and I2RL of the rugged vibration is set as the index value I2$flt$ of the rugged vibration of the vehicle body 18 at the positions corresponding to the two left wheels 12FL and 12RL. The larger one of the index values I2FR and I2RR of the rugged vibration is set as the index value I2$rt$ of the rugged vibration of the vehicle body 18 at the positions corresponding to the two right wheels 12FR and 12RR.

Figure 14:
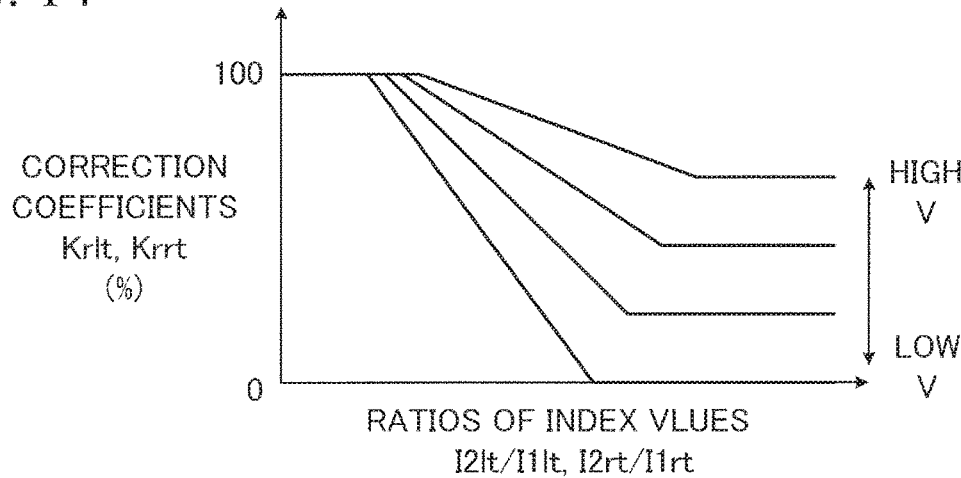
FIG. 14 is a map showing the relationships between the ratios $I2lt/I1lt$ and $I2rt/I1rt$ of the index values $I2lt$ and $I2rt$ showing the degree of rugged vibrations with respect to the index values $I1lt$ and $I1rt$ indicating the degrees of the floating vibrations, and the correction coefficients Krlt and Krrt.

In step 125, ratios I2$lt$/I1$lt$ and I2$rt$/I1$rt$ of the index values I2$lt$ and I2$rt$ of the rugged vibration to the index values I1$lt$ and I1$rt$ of the floating vibrations are calculated, respectively. Further, correction coefficients Krlt and Krrt for the two left wheels and the two right wheels are calculated by referring to the map shown in FIG. 14 based on the ratios I2$lt$/I1$lt$ and I2$rt$/I1$rt$.

In step 135, the correction coefficients Krlt and Krrt are corrected by low-pass filtering so that the rates of change are limited.

In step 145, final target damping forces Ffti of the shock absorbers 20FL to 20RR are calculated according to the following formulas (12) to (15) using the corrected correction coefficients Krlt and Krrt.

$$FftFL = Krlt \cdot FtFL \quad (12)$$

$$FftFR = Krrt \cdot FtFR \quad (13)$$

$$FftRL = Krlt \cdot FtRL \quad (14)$$

$$FftRR = Krrt \cdot FtRR \quad (15)$$

[Sixth Embodiment]

Figure 9:
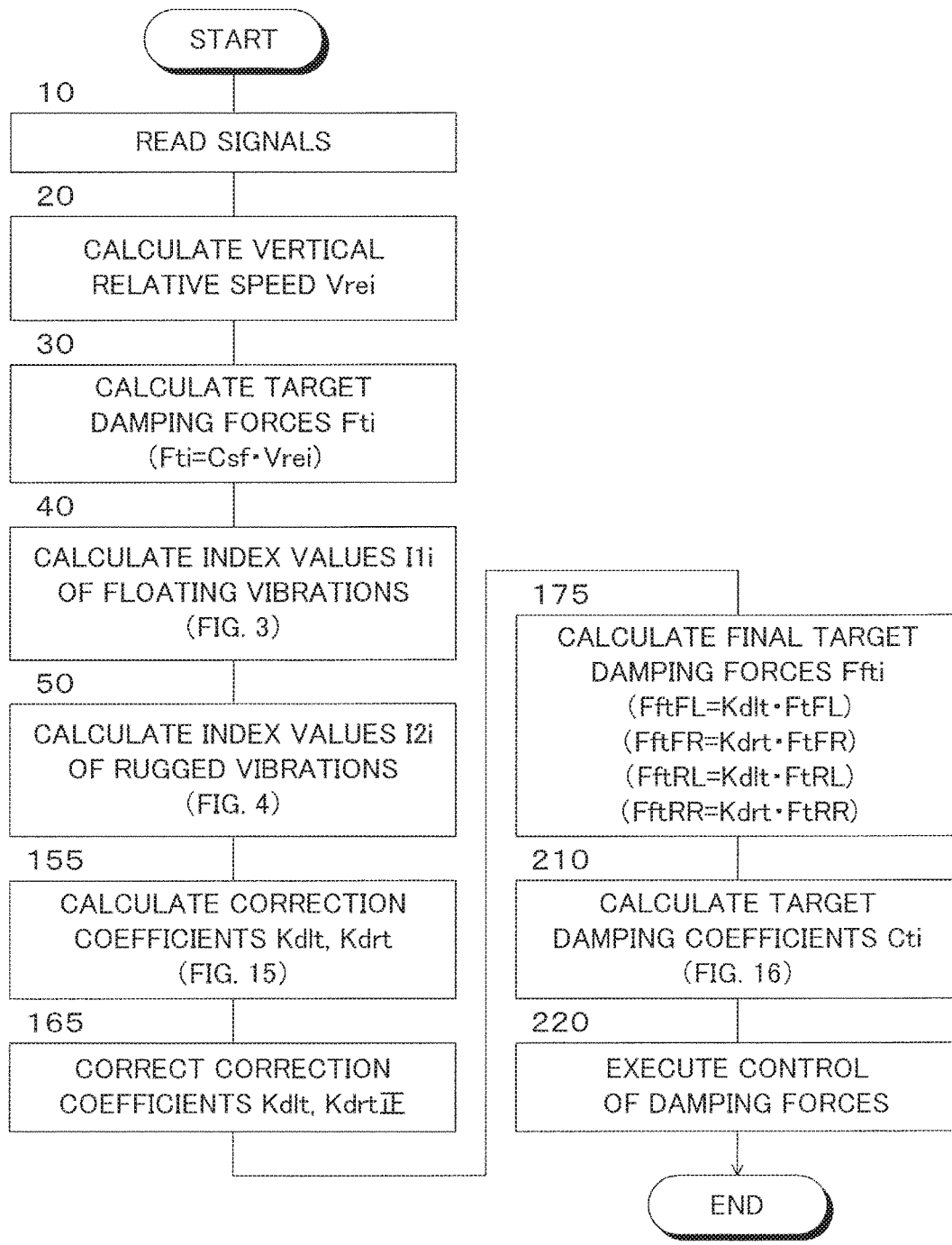
FIG. 9 is a flowchart showing a damping force control routine in a sixth embodiment of the damping force control device according to the present disclosure.

The sixth embodiment is configured as a modification example of the fourth embodiment, and the damping force control in the sixth embodiment is performed for the two left wheels and the two right wheels, for example, according to the flowchart shown in FIG. 9. Steps 10 to 50 and steps 210 and 220 are executed in the same manners as in the fourth embodiment. In place of steps 150 to 170 in the fourth embodiment, steps 155 to 175 are executed, respectively.

In step 155, similarly to step 150 in the fourth embodiment, index value I1$lt$ of the floating vibration and index value I2$lt$ of the rugged vibration of the vehicle body 18 at the positions corresponding to the two left wheels 12FL and 12RL are calculated. Similarly, index value I1$rt$ of the floating vibration and index value I2$rt$ of the rugged vibration of the vehicle body 18 at positions corresponding to the two right wheels 12FR and 12RR are calculated.

Figure 15:
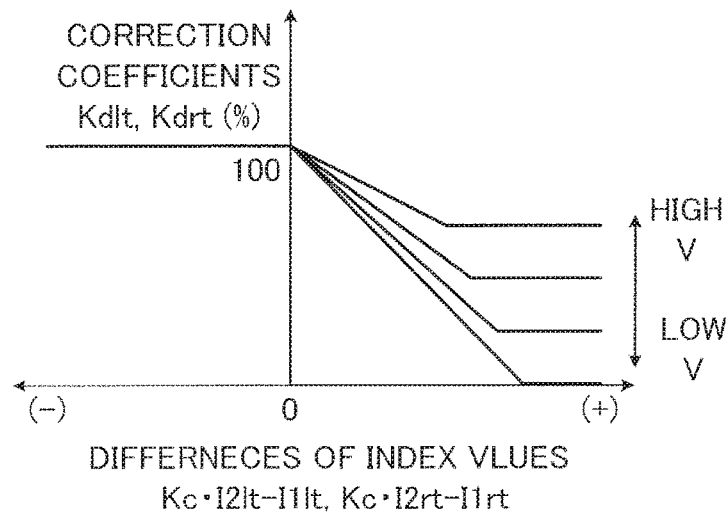
FIG. 15 is a map showing the relationship between the differences $Kc·I2lt–I1lt$ and $Kc·I2rt–I1rt$ between the product of the index values $I2lt$ and $I2rt$ indicating the degree of rugged vibrations and the correction coefficient Kc and the index values $I1lt$ and $I1rt$ indicating the degree of floating vibrations, and the correction coefficients Kdlt and Kdrt.

In step 155, similarly to step 150 in the second embodiment, a difference Kc·I2$lt$−I1$lt$ between the product of the index value I2$lt$ of the rugged vibration and the correction coefficient Kc and the index value I1$lt$ of the floating vibration is calculated. A difference Kc·I2$rt$−I1$rt$ between the product of the index value I2$rt$ of the rugged vibration and the correction coefficient Kc and the index value I1$rt$ of the floating vibration is calculated. Furthermore, correction coefficients Kdlt and Kdrt for the left two wheels and the right two wheels are calculated by referring to the map shown in FIG. 15 based on the differences Kc·I2$lt$−I1$lt$ and Kc·I2$rt$−I1$rt$, respectively.

In step 165, the correction coefficients Kdlt and Kdrt are corrected by low-pass filtering so that the rates of change are limited.

In step 175, final target damping forces Ffti of the shock absorbers 20FL to 20RR are calculated according to the following formulas (16) to (19) using the corrected correction coefficients Kdlt and Kdrt.

$$FftFL = Kdlt \cdot FtFL \quad (16)$$

$$FftFR = Kdrt \cdot FtFR \quad (17)$$

$$FftRL = Kdlt \cdot FtRL \quad (18)$$

$$FftRR = Kdrt \cdot FtRR \quad (19)$$

According to the above-described embodiments, the correction coefficients such as Kri are calculated such that the larger the magnitudes of the index values $I2i$ of the rugged vibration is relative to the magnitudes of the index values $I1i$ of the floating vibration, in other words, the higher the degree of the rugged vibration is relative to the degree of the floating vibration, the smaller the correction coefficients are. Further, the damping coefficients Ci of the shock absorbers 20FL to 20RR are controlled so that the damping forces Fi of the shock absorbers become the final target damping forces Ffti which are the products of the target damping forces Fti and the correction coefficients, that is, the target damping forces corrected by the correction coefficients.

Therefore, the damping forces of the shock absorbers 20FL to 20RR can be controlled in accordance with the relationship between the degree of the floating vibration components and the degree of the rugged vibration components so that the higher the degree of the rugged vibration components is relative to the degree of the floating vibration components, the smaller the damping forces are. Accordingly, when the degree of the rugged vibration components is low with respect to the degree of the floating vibration components, it is possible to prevent the damping forces of the shock absorbers from decreasing and to effectively attenuate the vibrations of the floating components. On the other hand, when the degree of the rugged vibrations components is high with respect to the degree of the floating vibration components, the damping forces of the shock absorbers are decreased so that vibrations of the unsprung mass received from a road surface are hardly transmitted to the sprung mass, which enables to reduce the possibility that the ride comfort deteriorates.

Further, according to the above-described embodiments, when diregarding a variable phase according to a vehicle speed V, the maps used for calculation of the correction coefficients such as Kri are one-dimensional maps having variable parameters of the ratios or the differences between the index values $I1i$ of the floating vibration and the index values of the rugged vibration. In other words, two-dimensional maps showing the relationships among the index values $I1i$ of the floating vibration, the index values $I2i$ of the rugged vibration and the correction coefficients are unnecessary. Therefore, it is not necessary to create maps by taking a lot of time and effort to determine necessary values experimentally, for example.

Further, according to the above-described embodiments, the correction coefficients such as Kri are variably set according to a vehicle speed V so that the correction coefficients increase as a vehicle speed increases. Consequently, the damping forces can be increased as a vehicle speed increases. Therefore, when a vehicle speed is low, it is possible to prevent the damping forces from becoming excessive to ensure good ride comfort of the vehicle, while on the other hand, when a vehicle speed is high, sufficient damping forces are generated to ensure good driving stability of the vehicle.

Further, according to the above-described embodiments, the rates of change of the correction coefficients such as Kri are limited in step 70 or the like. It is possible to reduce the possibility that the damping forces of the shock absorbers suddenly change due to sudden changes in the correction coefficients in accordance with the fluctuation of the index values $I1i$ of the floating vibration and the index values $I2i$ of the rugged vibration.

In particular, according to the above third to sixth embodiments, since the number of correction coefficients is two, as compared with the first and second embodiments in which four correction coefficients are calculated for the wheels, it is possible to reduce calculation load of the electronic control unit 28 and to reduce the possibility of delay in controlling the damping forces of the shock absorbers.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the index values $I1i$ of the floating vibration and the index values $I2i$ of the rugged vibration are the maximum values of absolute values of the floating components $Gz1i$ and the rugged components $Gz2i$, respectively, within the time period Tc. However, the index values $I1i$ and $I2i$ may be arbitrary values indicating the degree of floating vibrations and the degree of rugged vibrations, respectively, such as the integral values of the converted absolute values within the time period Tc or the integral values of the values exceeding a reference value out of the converted absolute values within the time period Tc.

In the first, third, and fifth embodiments described above, except for an area where the ratio of the index value of the rugged vibration to the index value of the floating vibration (for example, $I2i/I1i$) is close to 0 and an area where the ratio of the index values is a large positive, the correction coefficients such as Kri have linear relationships with the ratio of the index values. However, it is sufficient that at least in a predetermined area, the correction coefficients are smaller when the ratio of the index values is large than those when the ratio of the index values is small, and the correction coefficients may be, for example, nonlinear, stepwise or the like with respect to the ratio of the index values.

Likewise, in the above second, fourth and sixth embodiments, except for areas where the differences (for example, $Kc \cdot I2i - I1i$) between the index values of the floating vibration and the index values of the rugged vibration is negative and large positive values, the correction coefficients such as Kdi have linear relationships with the differences of the index values. However, it is sufficient that in at least a predetermined area, the correction coefficients may be smaller when the differences between the index values are large than those when the differences between the index values are small, and the correction coefficients may be, for example, nonlinear, stepwise or the like with respect to the differences between the index values.

Figure 17:
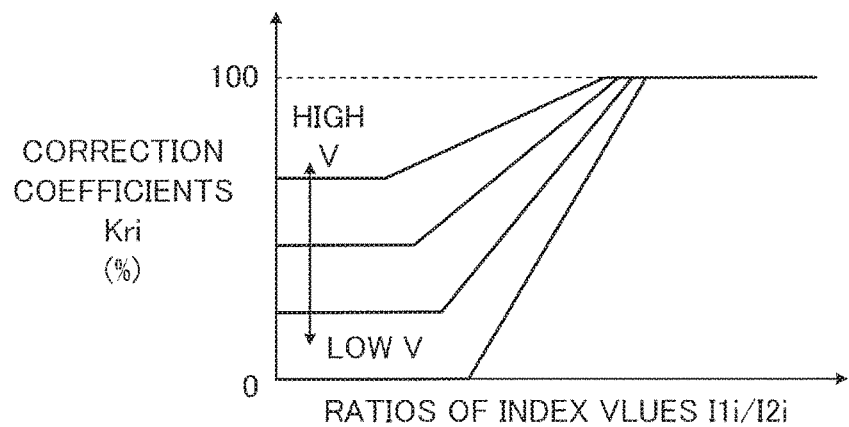
FIG. 17 is a map showing the relationships between the ratios $I1i/I2i$ of the index value $I1i$ indicating the degree of the floating vibrations to the index value $I2i$ showing the degree of rugged vibrations, and the correction coefficients Kri.

In the first, third and fifth embodiments described above, the parameters for calculating the correction coefficients such as Kri are the ratio of the index values of the rugged vibration to the index values of the floating vibration. However, the same parameters may be ratios (for example, $I1i/I2i$) of the index values of the floating vibration to the index values of the rugged vibration. In those cases, the smaller the ratios of the index values of the floating vibration to the index values of the rugged vibration, the larger the ratios of the index values of the rugged vibration to the index values of the floating vibration. Therefore, as shown in FIG. 17 for the correction coefficients Kri, for example, the maps for calculating the correction coefficients are opposite in right and left to the maps (FIGS. 10, 12 and 14) in the illustrated embodiments.

Figure 18:
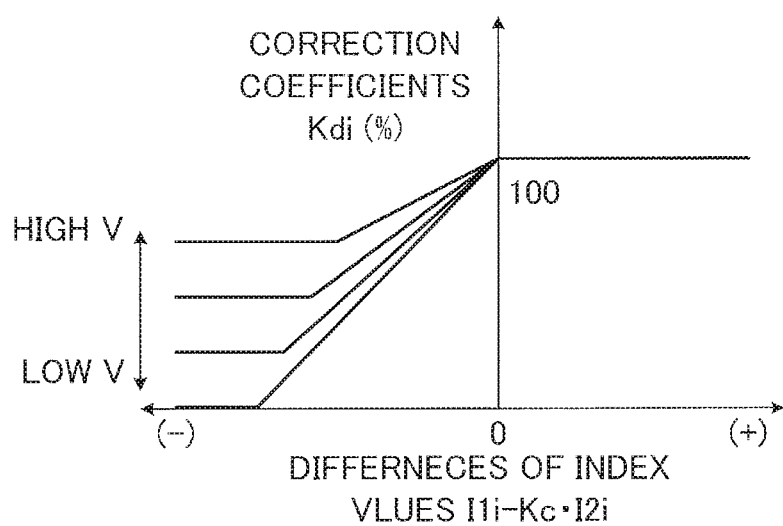
FIG. 18 is a map showing a relationships between differences $I1i–Kc·I2i$ between the index value $I1i$ indicating the degree of floating vibrations and the product of the index value $I2i$ indicating the degree of rugged vibrations and the correction coefficient Kc, and the correction coefficients Kdi.

Similarly, in the above second, fourth and sixth embodiments, the parameters for calculating the correction coefficients such as Kdi are the differences between the products of the index values of the rugged vibration and the correction coefficient Kc and the index values of the floating vibration. However, the same parameters may be the differences (for example, I1$i$–Kc·I2$i$) between the index values of the floating vibration and the products of the index values of the rugged vibration and the correction coefficient Kc. In those cases, the smaller the differences (the larger the absolute values of the differences that are negative values), the higher the degree of rugged vibration with respect to the degree of the floating vibration. Therefore, as shown in FIG. 18 for the correction coefficients Kdi, for example, the maps for calculating the correction coefficients are opposite in right and left to the maps (FIGS. 11, 13, and 15) of the above-described embodiments.

In the above-described embodiments, the correction coefficients such as Kri are variably set in accordance with a vehicle speed V so that the coefficients increase as a vehicle speed increases. However, the embodiments may be modified such that the correction coefficients are calculated using a map not dependent on a vehicle speed, and the correction coefficients are multiplied by a correction coefficient which increases as a vehicle speed V increases. Further, the correction coefficients may be calculated to values independent of a vehicle speed.

In the first, third and fifth embodiments described above, the corrections of the index values I2$i$ of the rugged vibration by the correction coefficient Kc that are executed in the second, fourth and sixth embodiments are not executed, but the index values I2$i$ of rugged vibration may be corrected by the correction coefficient Kc.

What is claimed is:

1. A damping force control device for a vehicle having damping force variable type shock absorbers mounted between a sprung mass and unsprung masses corresponding to wheels, detecting devices that detect vertical vibration state quantities of the sprung mass at positions of the wheels, and a control unit configured to control damping forces of the shock absorbers based on the vertical vibration state quantities of the sprung mass, wherein
the control unit is configured to:
calculate target damping forces of the shock absorbers based on the vertical vibration state quantities of the sprung mass;
extract first vibration components in a first frequency range including a vertical resonance frequency of the sprung mass and second vibration components in a frequency range between the vertical resonance frequency of the sprung mass and a resonance frequency of the unsprung masses from the vertical vibration state quantities of the sprung mass;
calculate correction coefficients so that the higher the degree of the second vibration with respect to the degree of the first vibration, the smaller the correction coefficients are, and so that the correction coefficients increase as a vehicle speed increases; and
control actuators of the shock absorbers to control damping coefficients of the shock absorbers so that the damping forces of the shock absorbers become final target damping forces which are the products of the calculated target damping forces and the calculated correction coefficients.

2. The damping force control device for a vehicle according to claim 1, wherein the control unit is configured to limit rates of change of the correction coefficients, and to control the damping forces of the shock absorbers so that the damping forces become the final target damping forces which are the products of the target damping forces and the correction coefficients whose rates of change are limited.

3. The damping force control device for a vehicle according to claim 1, wherein the control unit is configured to calculate first and second index values indicating the degrees of the first and second vibrations based on the first and second vibration components, respectively, and to calculate the correction coefficients based on the ratio of the first and second index values.

4. The damping force control device for a vehicle according to claim 1, wherein the control unit is configured to calculate the first and second index values indicating the degrees of the first and second vibrations based on the first and second vibration components, respectively, and to calculate the correction coefficients based on the difference between the first and second index values.

* * * * *